(12) United States Patent
Lehman

(10) Patent No.: US 11,117,530 B2
(45) Date of Patent: Sep. 14, 2021

(54) POLYVINYL CHLORIDE COVER LAYER FOR A VEHICLE INTERIOR COMPONENT

(71) Applicant: Motus Integrated Technologies, Holland, MI (US)

(72) Inventor: Philip Allen Lehman, West Olive, MI (US)

(73) Assignee: Motus Integrated Technologies, Holland, MI (US)

( * ) Notice: Subject to any disclaimer, the term of this patent is extended or adjusted under 35 U.S.C. 154(b) by 0 days.

(21) Appl. No.: 16/571,834

(22) Filed: Sep. 16, 2019

(65) Prior Publication Data

US 2021/0078506 A1     Mar. 18, 2021

(51) Int. Cl.
| | |
|---|---|
| *B29C 39/00* | (2006.01) |
| *B60R 13/02* | (2006.01) |
| *B29C 39/38* | (2006.01) |
| *D06N 3/06* | (2006.01) |
| *B29C 39/02* | (2006.01) |
| B29K 27/06 | (2006.01) |
| B29L 7/00 | (2006.01) |
| B29L 31/30 | (2006.01) |

(52) U.S. Cl.
CPC .......... *B60R 13/02* (2013.01); *B29C 39/003* (2013.01); *B29C 39/026* (2013.01); *B29C 39/38* (2013.01); *D06N 3/06* (2013.01); *B29K 2027/06* (2013.01); *B29L 2007/00* (2013.01); *B29L 2031/3005* (2013.01)

(58) Field of Classification Search
None
See application file for complete search history.

(56) References Cited

U.S. PATENT DOCUMENTS

| | | | | |
|---|---|---|---|---|
| 5,851,474 A * | 12/1998 | Allan | .................. | B29C 45/0082 264/403 |
| 7,922,956 B1 * | 4/2011 | Scheidmantel | ......... | B29C 44/18 264/294 |

\* cited by examiner

*Primary Examiner* — Monica A Huson
(74) *Attorney, Agent, or Firm* — Fletcher Yoder, P.C.

(57) ABSTRACT

A method of manufacturing a cover layer for a vehicle interior component includes forming a mold cavity via a first surface and a second surface spaced apart from one another by a distance. The first surface is configured to form a show surface of the cover layer, the second surface is configured to form a rear surface of the cover layer, and the distance is less than or equal to 1 mm. The method of manufacturing the cover layer also includes heating the first surface and/or the second surface, and flowing liquid polyvinyl chloride into the mold cavity to form the cover layer.

8 Claims, 4 Drawing Sheets

POLYVINYL CHLORIDE COVER LAYER FOR A VEHICLE INTERIOR COMPONENT

BACKGROUND

The present disclosure relates generally to a polyvinyl chloride cover layer for a vehicle interior component.

Certain vehicle interior components include a foam layer and a cover layer disposed over the foam layer. The cover layer may form a show surface of the vehicle interior component, and the foam layer may be disposed between the cover layer and a substantially rigid substrate. In certain vehicle interior components, the cover layer is formed from polyvinyl chloride (PVC) and configured to simulate the appearance of a leather cover layer.

BRIEF DESCRIPTION OF THE INVENTION

In certain embodiments, a method of manufacturing a cover layer for a vehicle interior component includes forming a mold cavity via a first surface and a second surface spaced apart from one another by a distance. The first surface is configured to form a show surface of the cover layer, the second surface is configured to form a rear surface of the cover layer, and the distance is less than or equal to 1 mm. The method of manufacturing the cover layer also includes heating the first surface and/or the second surface, and flowing liquid polyvinyl chloride into the mold cavity to form the cover layer.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
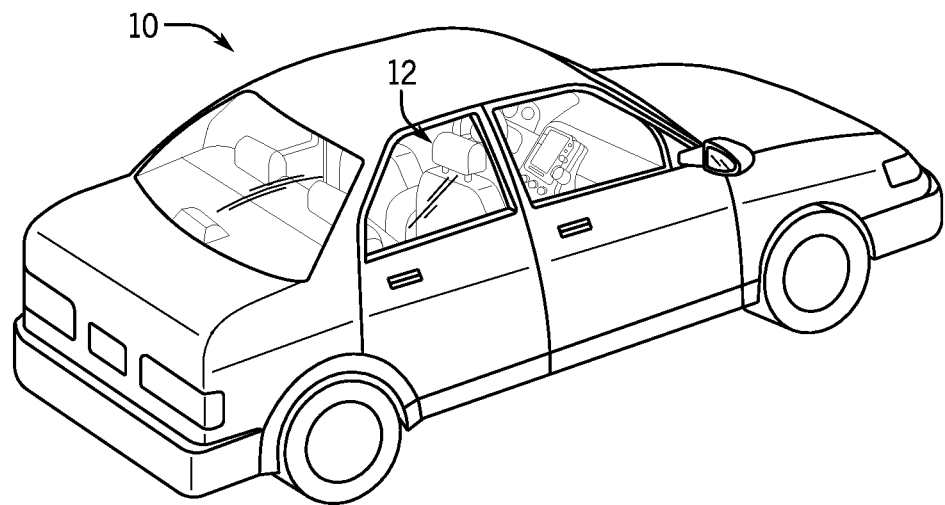
FIG. 1 is a perspective view of an embodiment of a vehicle that may include at least one vehicle interior component having a polyvinyl chloride cover layer.

FIG. 1 is a perspective view of an embodiment of a vehicle 10 that may include at least one vehicle interior component having a polyvinyl chloride cover layer. The vehicle interior component may be disposed within an interior 12 of the vehicle 10. In certain embodiments, the vehicle interior component includes a foam layer having a contact surface, and a cover layer having a rear/contact surface and a show surface. The show surface is configured to face the interior 12 of the vehicle 10, and the rear/contact surface is positioned on an opposite side of the cover layer from the show surface. In addition, the rear/contact surface of the cover layer is in contact with the contact surface of the foam layer. As discussed in detail below, the cover layer is formed from polyvinyl chloride (PVC) using a process that enables the cover layer to have a thickness of 1 mm or less. As a result, the tactile response of the vehicle interior component may be enhanced, as compared to a vehicle interior component having a thicker PVC cover layer. The enhanced tactile response may enable the cover layer to simulate a leather cover layer more effectively, thereby providing the vehicle interior component with a more deluxe/luxurious feel.

Figure 2:
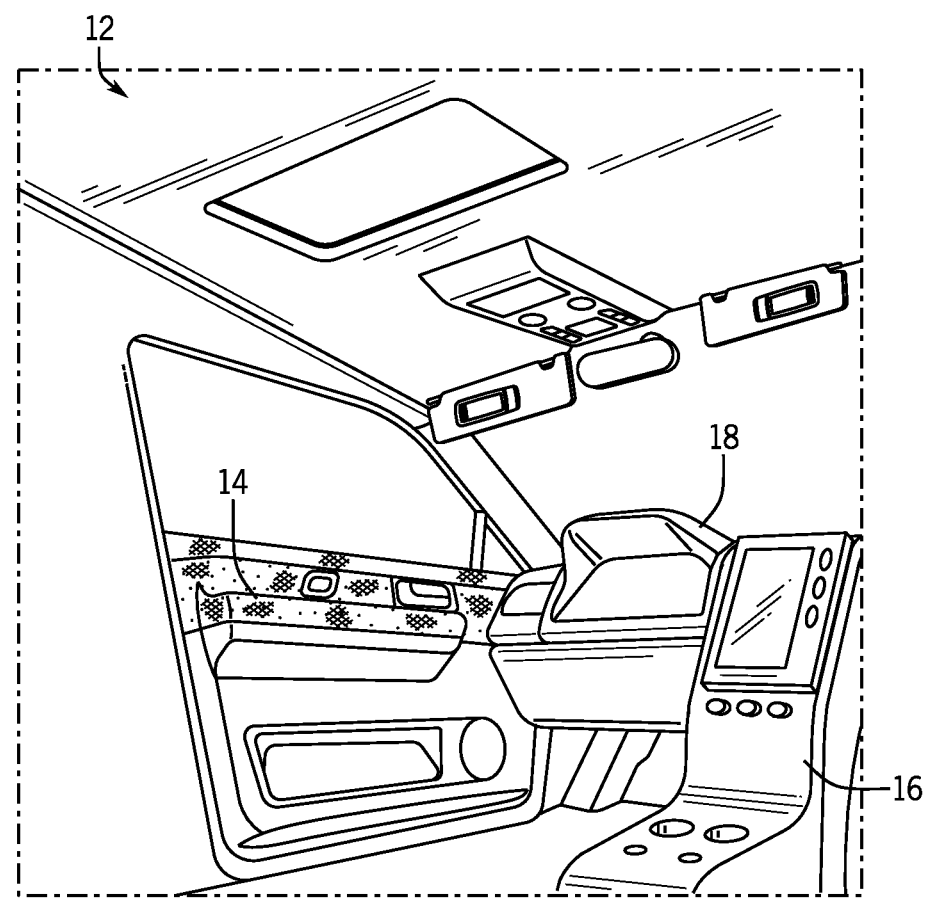
FIG. 2 is a perspective view of a part of the interior of the vehicle of FIG. 1.

FIG. 2 is a perspective view of a part of the interior 12 of the vehicle of FIG. 1. In the illustrated embodiment, an arm rest 14, a center console 16, and an instrument panel 18 are disposed within the interior 12 of the vehicle. The vehicle interior component disclosed herein may form at least a portion of the arm rest 14, at least a portion of the center console 16, at least a portion of the instrument panel 18, or at least a portion of another suitable element of the vehicle interior. In certain embodiments, the vehicle interior component includes a cover layer formed by a process including forming a mold cavity via a first surface and a second surface spaced apart from one another by a distance of less than or equal to 1 mm. The first surface is configured to form a show surface of the cover layer, and the second surface is configured to form a rear surface of the cover layer. The process also includes heating the first surface and/or the second surface, and flowing liquid PVC into the mold cavity to form the cover layer. As a result, a cover layer having a thickness of less than or equal to 1 mm is formed. Due to the thickness of the cover layer, the vehicle interior component which includes the cover layer may have an enhanced tactile response, thereby providing a more deluxe/luxurious feeling vehicle interior component.

Figure 3:
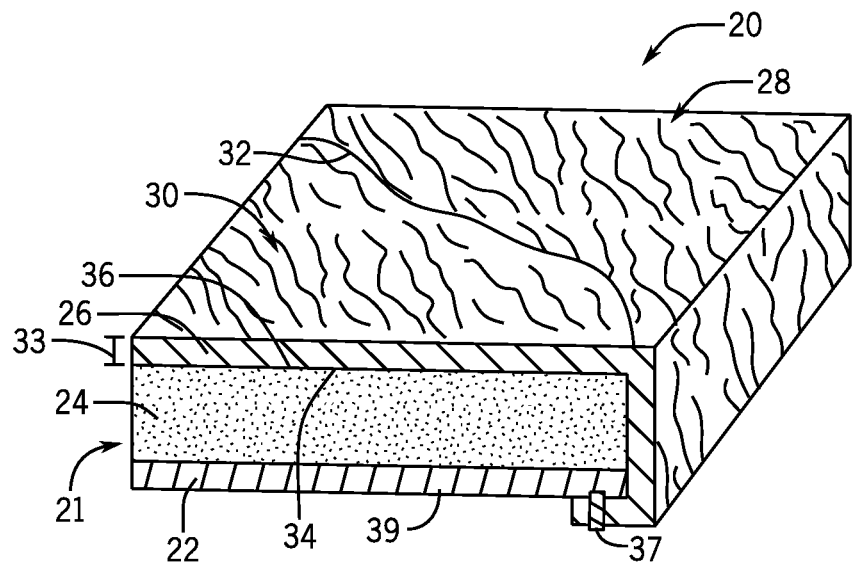
FIG. 3 is a cross-sectional perspective view of a portion of an embodiment of a vehicle interior component that may be disposed within the vehicle interior of FIG. 2.

FIG. 3 is a cross-sectional perspective view of a portion of an embodiment of a vehicle interior component 20 that may be disposed within the vehicle interior of FIG. 2. In the illustrated embodiment, the vehicle interior component 20 includes a base 21 having a substrate layer 22 (e.g., substantially rigid substrate) and a foam layer 24. The vehicle interior component 20 also includes a cover layer 26 formed from PVC. As illustrated, the cover layer 26 has a show surface 28 that is configured to face the interior of the vehicle. For example, if the vehicle interior component forms part of an armrest, the arm of a vehicle occupant may be placed in contact with the show surface 28 of the cover layer 26. Furthermore, if the vehicle interior component forms part of an instrument panel, the show surface 28 of the cover layer 26 may be visible to the vehicle occupant.

In the illustrated embodiment, a grain pattern 30 is formed within the show surface 28 of the cover layer 26. The grain pattern 30 is configured to simulate leather grain, thereby giving the PVC cover layer 26 the appearance of a leather cover layer. Furthermore, in the illustrated embodiment, the grain pattern 30 has at least one variation 32 that simulates at least one blemish in the leather grain. The illustrated variation 32 is configured to simulate a wrinkle within the hide of a leather cover layer. However, in other embodiments, the grain pattern may include a variation that simulates another suitable type of blemish within the leather grain, such a vein, a brand mark, etc. While the illustrated grain pattern 30 has a single variation 32, in other embodiments, the grain pattern may include any suitable number of variations (e.g., 0, 1, 2, 3, 4, 5, 6, 7, 8, or more). For example, in certain embodiments, the grain pattern may not include any variations. The variation(s) in the grain pattern may enhance the appearance of the PVC cover layer by providing a more accurate representation of a leather cover layer. As a result, the vehicle interior component may have a more deluxe/luxurious appearance. While a grain pattern 30 is formed within the show surface 28 of the cover layer 26 that simulates leather grain in the illustrated embodiment, in other embodiments, another suitable pattern (e.g., a texture that simulates a woven fiber material, one or more stitched seams, etc.) may be formed within the show surface of the cover layer, or the show surface of the cover layer may be substantially smooth.

In the illustrated embodiment, the PVC cover layer 26 has a thickness 33 of less than or equal to 1 mm. For example, in certain embodiments, the thickness 33 of the cover layer may be about 0.1 mm to about 1.0 mm, about 0.2 mm to about 0.95 mm, about 0.3 mm to about 0.9 mm, about 0.4 mm to about 0.85 mm, or about 0.5 mm to about 0.8 mm. By way of further example, the thickness 33 of the PVC cover layer may be about 1 mm (e.g., 0.95 mm to 1.05 mm), less than 1 mm, less than 0.95 mm, or less than 0.9 mm. As a result, the tactile response of the vehicle interior component 20 may be enhanced, as compared to a vehicle interior component having a thicker cover layer (e.g., a thicker PVC cover layer). The enhanced tactile response may enable the cover layer 26 to simulate a leather cover layer more effectively, thereby providing the vehicle interior component 20 with a more deluxe/luxurious feel. In certain embodiments, the thickness 33 of the PVC cover layer 26 may be substantially constant throughout the PVC cover layer. For example, the thickness of the PVC cover layer may vary by less than 0.05 mm, less than 0.1 mm, or less than 0.15 mm. However, in other embodiments, the thickness of the PVC cover layer may vary (e.g., while having a maximum thickness of less than or equal to 1 mm).

In certain embodiments, the PVC of the cover layer 26 is particularly formulated to establish a soft cover layer that substantially matches the softness of natural leather. One measure of hardness is the resistance to indentation, otherwise referred to as Durometer, denoted in the Shore A scale, for example. Within the Durometer scale, materials are generally characterized by ranges. Hard or rigid elastomers generally include those having a Durometer greater than about 90 Shore A, soft elastomers generally include those having a Durometer of about 50 Shore A to about 90 Shore A, and super-soft elastomers generally include those having a Durometer below about 50 Shore A. In certain embodiments, the cover layer 26 may have a Durometer of about 55 to about 90 Shore A, about 60 to about 80 Shore A, about 60 to about 70 Shore A, or about 60 to about 65 Shore A.

In certain embodiments, the PVC of the cover layer 26 is particularly formulated to establish certain structural properties that enhance the longevity of the vehicle interior component. For example, the PVC may be particularly formulated such that the resultant cover layer has a tear strength of at least 15 kN/m (e.g., using the ISO 34, Method B, Procedure A tear strength test). By way of further example, the PVC may be particularly formulated such that the resultant cover layer has a tear strength of about 10 kN/m to about 40 kN/m, about 12 kN/m to about 30 kN/m, or about 15 kN/m to about 25 kN/m. Furthermore, in certain embodiments, the PVC may be particularly formulated such that the resultant cover layer has a tensile strength of at least 3 MPa (e.g., using the ISO R527, Type 5 test). By way of further example, the PVC may be particularly formulated such that the resultant cover layer has a tensile strength of about 2 MPa to about 15 MPa, about 2.5 MPa to about 12 MPa, or about 3 MPa to about 10 MPa.

In certain embodiments, the PVC of the cover layer 26 is particularly formulated to establish a low gloss/dull appearance, thereby simulating the appearance of a leather cover layer (e.g., as compared to certain PVC cover layers which have a higher gloss appearance). For example, the PVC may be particularly formulated such that the resultant cover layer has a glossiness/shininess of less than 5 gloss units (GU). By way of further example, the PVC may be particularly formulated such that the resultant cover layer has a glossiness/shininess of about 1 GU to about 5 GU, about 1 GU to about 3 GU, or about 1 GU to about 2 GU. Furthermore, the PVC may be particularly formulated such that the resultant cover layer has a glossiness/shininess of less than 5 GU, less than 4 GU, less than 3 GU, less than 2 GU, or less than 1 GU. The low gloss appearance of the PVC cover layer 26 may simulate the look of a leather cover layer more effectively than typical PVC cover layers, which may have a glossiness/shininess of about 9 GU.

Furthermore, in certain embodiments, the PVC of the cover layer 26 is particularly formulated to establish a tackiness that simulates the feel of a leather cover layer. One technique for measuring tackiness involves placing two samples of the cover layer in contact with one another, in which each sample has dimensions of 50 mm by 76 mm. A 1 kg weight is then placed on the samples, and a force sufficient to cause one sample to move relative to the other sample is measured. For example, the force sufficient to cause a leather cover layer sample to move relative to another leather cover layer sample may be about 2.7 N to about 3.5 N while the samples are static and about 1.7 N to about 2.7 N while one sample is moving relative to the other sample. The PVC of the cover layer may be particularly formulated to simulate the tackiness of a leather cover layer. For example, the PVC may be particularly formulated such that the force sufficient to cause one sample of the resultant cover layer to move relative to another sample of the resultant cover layer is about 4 N while the samples are static and about 3 N while one sample is moving relative to the other sample. As a result, the tackiness of the PVC cover layer may effectively simulate the tackiness of a leather cover layer (e.g., as compared to typical PVC cover layers, in which the force sufficient to cause one sample of the PVC cover layer to move relative to another sample of the PVC cover layer is about 6 N while the samples are static and about 5.4 N while one sample is moving relative to the other sample). As a result of the thickness of the PVC cover layer and, in certain embodiments, the formulation of the PVC, the cover layer may simulate a leather cover layer more effectively, thereby providing the vehicle interior component with a more deluxe/luxurious feel. While certain ranges of Durometer, tear strength, tensile strength, glossiness/shininess, and tackiness of the PVC cover layer are described above, in certain embodiments, at least one parameter of the PVC cover layer may be outside of the respective ranges described above.

As illustrated, the cover layer 26 also includes a contact (e.g., rear) surface 34 positioned on an opposite side of the cover layer 26 from the show surface 28. In addition, the foam layer 24 has a corresponding contact surface 36 facing the contact surface 34 of the cover layer 26. In the illustrated embodiment, the contact surface 34 of the cover layer 26 is in direct contact with the contact surface 36 of the foam layer 24. In certain embodiments, the foam layer includes (e.g., is formed from) a polyurethane foam. In the illustrated embodiment, the substrate layer 22 is in contact with the foam layer 24. In certain embodiments, the substrate layer 22 may be substantially rigid, thereby providing structural support to the vehicle interior component 20. For example, the substrate layer may be formed from a substantially rigid plastic or composite material. Furthermore, in certain embodiments, the substrate 22 may be bonded to the foam layer 24 (e.g., via an adhesive connection). However, in other embodiments, the substrate may be omitted, and the vehicle interior component may be formed by the foam layer and the cover layer (e.g., alone or in combination with other suitable element(s)).

In the illustrated embodiment, the cover layer 26 is coupled to the substrate layer 22 by one or more fasteners 37. As illustrated, the cover layer 26 wraps around a side of the base 21, such that a portion of the cover layer 26 engages a bottom surface 39 of the substrate 22. The fastener(s) 37 extend through the cover layer 26 and into (e.g., through) the substrate 22 to couple the cover layer 26 to the substrate. While a single fastener is shown in FIG. 3, in certain embodiments, multiple fasteners may be utilized to couple the cover layer to the substrate (e.g., at any suitable locations). The fastener(s) may include pin(s), staple(s), tack(s), other suitable type(s) of fastener(s), or a combination thereof. Furthermore, while the cover layer is wrapped around a single side of the base in the illustrated embodiment, in other embodiments, the cover layer may be wrapped around multiple sides of the base to facilitate coupling between the cover layer and the substrate (e.g., via corresponding fasteners). In addition, while the cover layer is coupled to the substrate layer by fastener(s) in the illustrated embodiment, in other embodiments, the cover layer may be coupled to the substrate by other suitable type(s) of connection(s), such as an adhesive connection, etc.

In certain embodiments, the cover layer may be selected from the PVC cover layer described above and a leather cover layer. For example, the cover layer may be selected based on options and/or a trim level of the vehicle including the vehicle interior component. The selected cover layer is then disposed about at least a portion of the base of the vehicle interior component, as illustrated. Because the PVC cover layer has a thickness of less than or equal to 1 mm, the thickness of the PVC cover layer may be substantially equal to the thickness of the leather cover layer (e.g., which is less than or equal to 1 mm thick). Accordingly, the PVC cover layer and the leather cover layer may be directly interchangeable with one another. As a result, a common base, including the foam layer and the substrate layer, may be utilized to form a vehicle interior component from either cover layer, thereby substantially reducing the cost and complexity associated with designing and manufacturing vehicle interior components (e.g., as compared to designing and manufacturing a first base for the leather cover layer and a second base for the PVC cover layer). As used herein with regard to cover layer thickness, "substantially equal" refers to a variation in thickness of less than 0.15 mm, less than 0.1 mm, or less than 0.05 mm.

Figure 4:
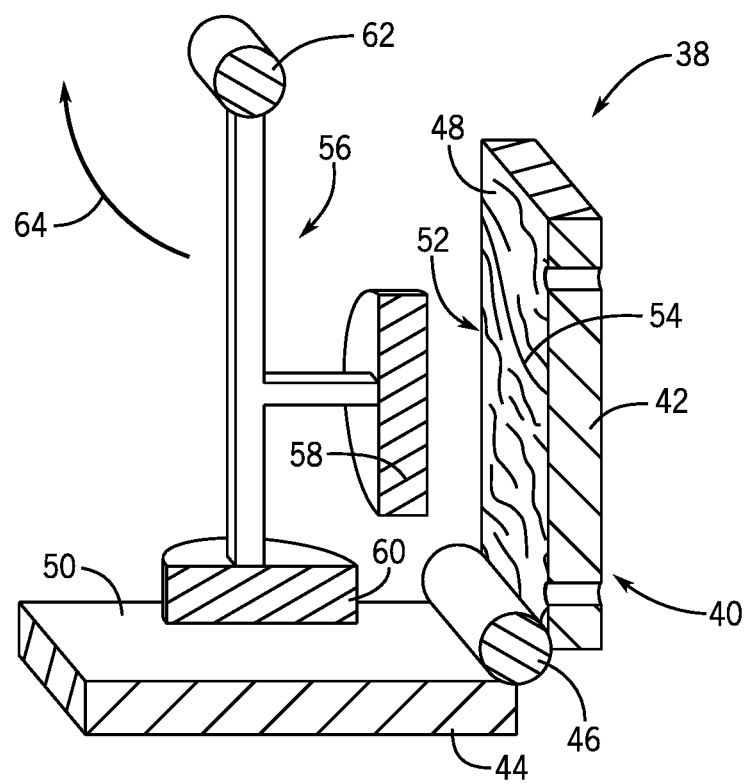
FIG. 4 is a cross-sectional perspective view of a portion of an embodiment of a mold assembly configured to form a polyvinyl chloride cover layer of a vehicle interior component, in which a mold of the mold assembly is in an open state.

FIG. 4 is a cross-sectional perspective view of a portion of an embodiment of a mold assembly 38 configured to form a polyvinyl chloride cover layer of a vehicle interior component, in which a mold 40 of the mold assembly 38 is in an open state. In the illustrated embodiment, the mold 40 includes a first portion 42, a second portion 44, and a pivot joint 46 rotatably coupling the first portion 42 and the second portion 44 to one another. The first portion 42 has a first surface 48 configured to form the show surface of the cover layer, and the second portion 44 has a second surface 50 configured to form the rear/contact surface of the cover layer. In the illustrated embodiment, the first surface 48 has a grain pattern 52 configured to establish the corresponding grain pattern within the show surface of the cover layer that simulates leather grain, as shown in FIG. 3. As illustrated, the grain pattern 52 has at least one variation 54 configured to form the at least one corresponding variation within the show surface of the cover layer that simulates at least one blemish in the leather grain. As previously discussed, each blemish may include a wrinkle, a vein, a brand mark, or another suitable type of blemish. While the illustrated first surface 48 includes the grain pattern 52 and the variation 54, in other embodiments, the variation may be different or omitted, and/or the grain pattern may be different or omitted, thereby forming a corresponding show surface of the cover layer. While lateral sides of the mold 40 are not shown in the illustrated embodiment, in certain embodiments, the mold includes lateral sides to contain the liquid PVC within a cavity formed by the mold while the mold is in a closed state to facilitate formation of the PVC cover layer.

In the illustrated embodiment, the mold assembly 38 includes an inductive heater 56 having a first inductive heating element 58 and a second inductive heating element 60. The first inductive heating element 58 is configured to induce an electrical current (e.g., eddy current) within the first portion 42 of the mold 40, and the second inductive heating element 60 is configured to induce an electrical current (e.g., eddy current) within the second portion 44 of the mold. The induced current within each mold portion generates heat within the mold portion, thereby heating the respective mold surface. While the inductive heater 56 has two inductive heating elements in the illustrated embodiment, in other embodiments, the inductive heater may include a single inductive heater configured to heat only one of the first surface and the second surface. Furthermore, in certain embodiments, the inductive heater may include multiple heating elements configured to heat the first surface, and/or the inductive heater may include multiple heating elements configured to heat the second surface.

In the illustrated embodiment, the inductive heater 56 is coupled to a frame (e.g., which is positioned adjacent to the mold 40) by a pivot joint 62. The pivot joint 62 enables the inductive heater to move from the illustrated heating position to a storage position via rotation about the pivot joint 62 in a direction 64. As discussed in detail below, with the inductive heater 56 in the storage position, the mold 40 may be transitioned from the illustrated open state to a closed state. While the inductive heater 56 is configured to move between the heating position and the storage position via rotation in the illustrated embodiment, in other embodiments, the inductive heater may be configured to translate between positions. Furthermore, while an inductive heater is used to heat the both portions of the mold in the illustrated embodiment, in other embodiments, other suitable heating system(s) may be utilized to heat at least one portion of the mold. For example, in certain embodiments, an electrical heater or a fluid heater (e.g., radiator, heat exchanger, etc.) may be movable between a storage position and a heating position to heat at least one portion of the mold. Furthermore, in certain embodiments, an electrical heater or a fluid heater (e.g., radiator, heat exchanger, etc.) may be embedded within/coupled to at least one portion of the mold and configured to heat the respective portion(s) of the mold.

Figure 5:
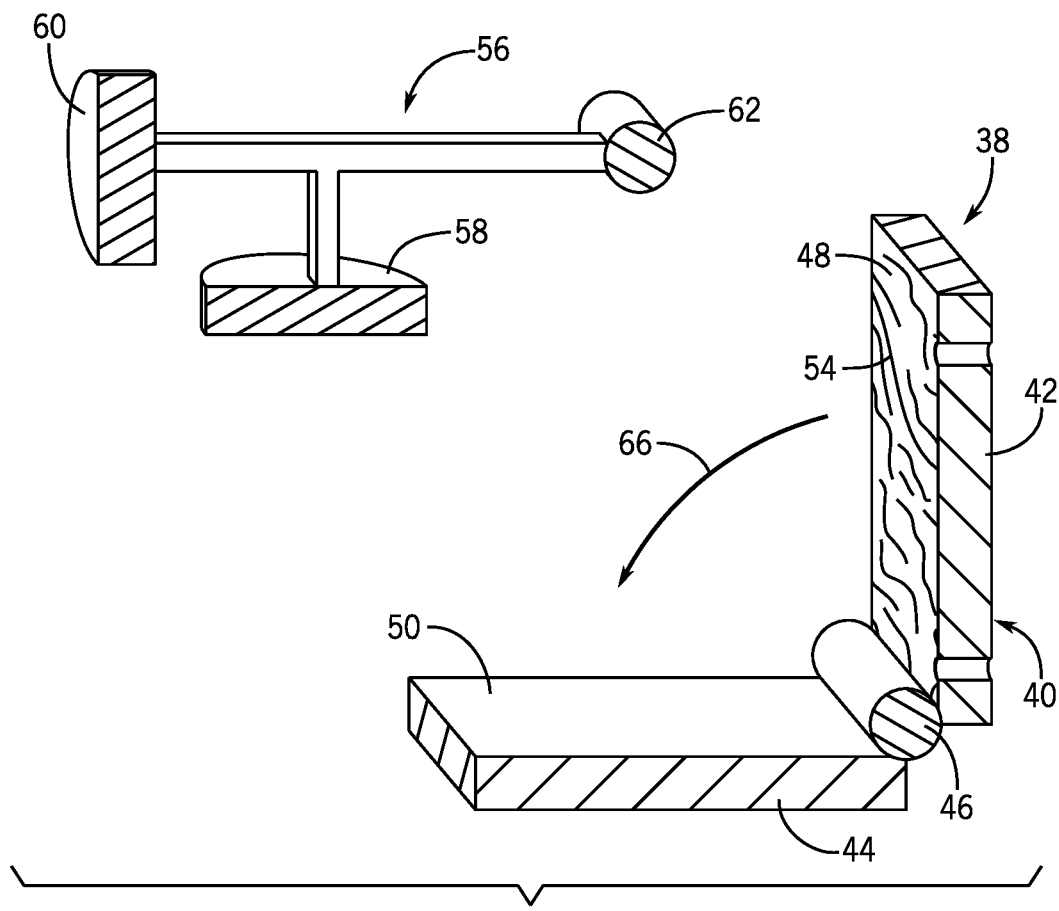
FIG. 5 is a cross-sectional perspective view of a portion of the mold assembly of FIG. 4, in which the mold is in the open state and heating elements are moved away from the mold.

FIG. 5 is a cross-sectional perspective view of a portion of the mold assembly 38 of FIG. 4, in which the mold 40 is in the open state and heating elements of the inductive heater 56 are moved away from the mold 40. With the inductive heater 56 positioned in the illustrated storage position, the mold 40 may be transitioned from the illustrated open state to the closed state. In the illustrated embodiment, the mold 40 is transitioned to the closed state via rotation of the first portion 42 of the mold 40 in a direction 66 about the pivot joint 46. However, in other embodiments, the mold may be transitioned from the open state to the closed state via rotation of the second portion of the mold, via translation of the first portion of the mold, via translation of the second portion of the mold, or some combination of rotation and/or translation of the first and/or second mold portions. For example, in certain embodiments, the pivot joint may be omitted, and the mold may be transitioned between the open state and the closed state via translation of the first portion of the mold and/or the second portion of the mold. As discussed in detail below, with the mold in the closed state, a mold cavity is formed, and liquid PVC may flow into the mold cavity to form the cover layer.

Figure 6:
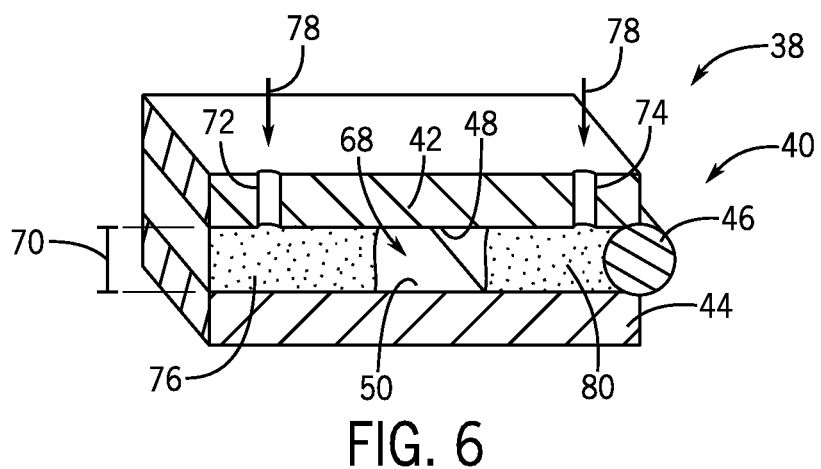
FIG. 6 is a cross-sectional perspective view of a portion of the mold assembly of FIG. 4, in which the mold is in a closed state.

FIG. 6 is a cross-sectional perspective view of a portion of the mold assembly of FIG. 4, in which the mold 40 is in a closed state. With the mold 40 in the illustrated closed state, a mold cavity 68 is formed between the first surface 48 of the first portion 42 of the mold 40 and the second surface 50 of the second portion 44 of the mold 40. As previously discussed, the first surface 48 is configured to form the show surface of the cover layer, and the second surface 50 is configured to form the rear/contact surface of the cover layer. The first surface 48 is spaced apart from the second surface 50 by a distance 70 while the mold 40 is in the closed state. Accordingly, a cover layer having a thickness substantially equal to the distance 70 is formed within the mold cavity 68. In the illustrated embodiment, the distance 70 is less than or equal to 1 mm, thereby enabling the mold 40 to form a cover layer having a thickness of less than or equal to 1 mm. The distance 70 may be particularly selected to form a cover layer having a substantially corresponding thickness.

With the mold 40 in the illustrated closed state, liquid PVC may flow into the mold cavity 68 to form the cover layer. In certain embodiments, the liquid PVC is particularly formulated (e.g., by controlling the molecular weight of the liquid PVC) to facilitate flow of the liquid PVC through the mold cavity 68, which has a separation distance 70 between the first and second mold surfaces of less than or equal to 1 mm (e.g., while facilitating formation of a PVC cover layer having one or more of the physical properties described above). For example, the PVC may be particularly formulated such that a melt mass flow rate (e.g., the mass flow rate of the liquid PVC) is about 100 grams per 10 minutes (e.g., using the ISO 1133-1 test, using the ASTM D1238 test, etc.). By way of further example, the PVC may be particularly formulated such that the melt mass flow rate is about 80 to about 120 grams per 10 minutes, about 90 to about 110 grams per 10 minutes, or about 95 to about 105 grams per 10 minutes. Furthermore, the PVC may be particularly formulated such that the melt mass flow rate is greater than 80 grams per 10 minutes, greater than 90 grams per 10 minutes, greater than 95 grams per 10 minutes, or greater than 100 grams per 10 minutes. The high melt mass flow rate of the liquid PVC (e.g., in combination with the heated mold surface(s), as described below) facilitates flow of the liquid PVC through the mold cavity 68, which has a thickness (e.g., distance 70) of less than or equal to 1 mm (e.g., as compared to typical liquid PVC, which may have a melt mass flow rate of about 15 to about 50 grams per 10 minutes, and may not flow through an entire mold cavity having a thickness of less than or equal to 1 mm before the PVC sets/solidifies).

In the illustrated embodiment, the first portion 42 of the mold 40 has a first opening 72 and a second opening 74, positioned remote from the first opening 72. A first portion 76 of the liquid PVC 78 may flow through the first opening 72 into the mold cavity 68, and a second portion 80 of the liquid PVC 78 may flow through the second opening 74 into the mold cavity. Because the liquid PVC flows into the mold cavity from two separated openings, the mold cavity may be filled with liquid PVC more quickly (e.g., as compared to flowing liquid PVC through a single opening to fill the mold cavity). In addition, due to the high melt mass flow rate of the liquid PVC and the heated mold surface(s), as discussed above, the liquid PVC may flow throughout the entire mold cavity, which has a thickness of less than or equal to 1 mm, before solidifying/setting. As a result, the possibility of forming a knit line (e.g., an inconsistency within the resultant PVC cover layer at the intersection between separate liquid PVC flows) is substantially reduced or eliminated. While the two openings are formed within the first portion 42 of the mold 40 in the illustrated embodiment, in other embodiments, at least one opening may be formed within another suitable portion of the mold, such as the second portion 44. Furthermore, while the mold 40 has two openings in the illustrated embodiment, in other embodiments, the mold may have more or fewer openings (e.g., 1, 2, 3, 4, 5, 6, 7, 8, or more).

Utilizing the mold assembly described above with reference to FIGS. 4-6, a PVC cover layer may be formed by transitioning the mold 40 to the open state (e.g., if the mold 40 is in the closed state). The inductive heater 56 may then be transitioned (e.g., rotated about the pivot joint 62) from the storage position to the heating position. The first surface 48 may be heated by the first inductive heating element 58, and/or the second surface 50 may be heated by the second inductive heating element 60. Once the surface(s) are heated, the inductive heater 56 may be transitioned (e.g., rotated about the pivot joint 62) from the heating position to the storage position. The mold 40 may then be transitioned from the open state to the closed state, thereby forming the mold cavity 68. Next, the liquid PVC 78 may flow through the openings into the mold cavity 68, thereby forming the PVC cover layer (e.g., as the liquid PVC sets/solidifies within the mold cavity 68). The mold 40 may then be transitioned to the open state, thereby facilitating removal of the formed PVC cover layer from the mold 40.

Figure 7:
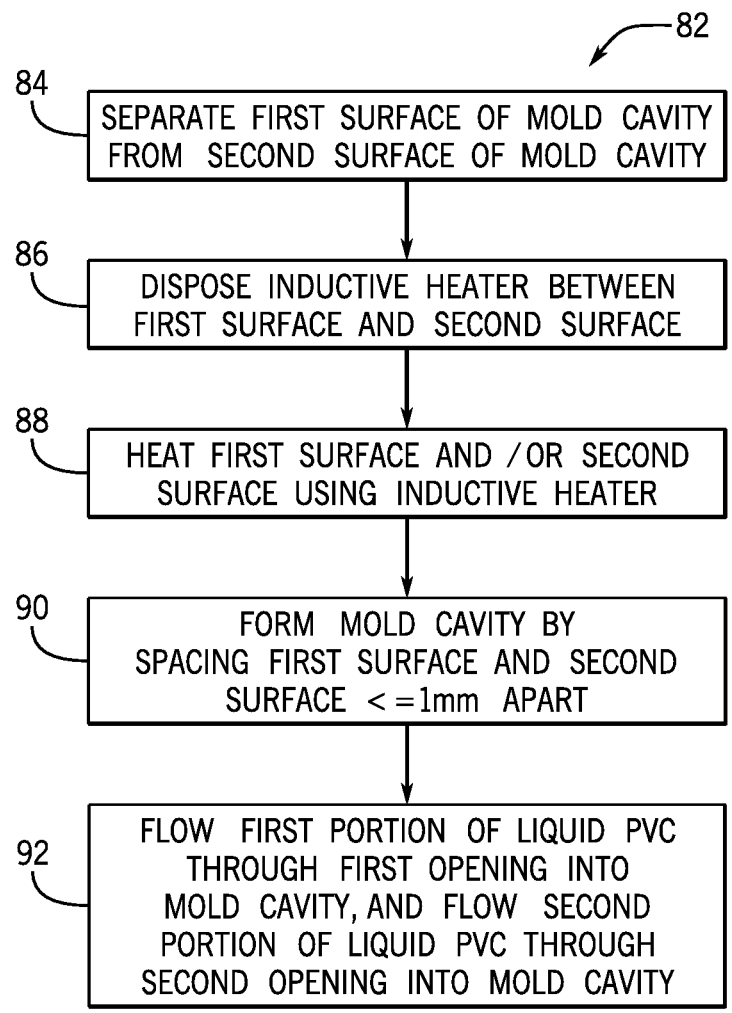
FIG. 7 is a flow chart of an embodiment of a method of manufacturing a cover layer for a vehicle interior component.

FIG. 7 is a flow chart of an embodiment of a method 82 of manufacturing a cover layer for a vehicle interior component. First, as represented by block 84, the first surface of the mold cavity is separated from the second surface of the mold cavity. For example, the first surface of the mold cavity may be formed on the first portion of the mold, and the second surface of the mold cavity may be formed on the second portion of the mold. The first portion of the mold may be rotatably coupled to the second portion of the mold by a pivot joint. Accordingly, separating the first surface and the second surface from one another includes rotating the first portion away from the second portion, or vice versa, about the pivot joint.

Next, as represented by block 86, the inductive heater is disposed between the first surface and the second surface of the mold cavity. For example, the inductive heater may be rotatably coupled to a frame (e.g., which is positioned adjacent to the mold) by a pivot joint. Accordingly, the inductive heater may be rotated about the pivot joint from the storage position (e.g., which enables separation of the first and second surfaces of the mold cavity) to the heating position (e.g., in which inductive heating element(s) are positioned proximate to respective surface(s) of the mold cavity). As represented by block 88, the first surface and/or the second surface of the mold cavity is heated by the inductive heater. As previously discussed, the first surface may be heated by the first inductive heating element of the inductive heater, and/or the second surface may be heated by the second inductive heating element of the inductive heater. Once the first surface and/or the second surface is heated, the inductive heater may be transitioned (e.g., rotated) to the storage position to enable the mold to transition to the closed state. While the first surface and/or the second surface is heated by an inductive heater in the illustrated embodiment, in other embodiments, the first surface and/or the second surface of the mold cavity may be heated by other suitable type(s) of heater(s) (e.g., heat exchanger, electrical heater, etc.). Furthermore, in certain embodiments, the heater may be embedded within the mold or mounted to the mold. In such embodiments, the step of disposing the heater between the first and second surfaces may be omitted.

After the first surface and/or the second surface is heated (e.g., and the inductive heater is moved to the storage position), the mold cavity is formed by spacing the first surface and the second surface of the mold cavity a distance apart, as represented by block 90. For example, the first surface of the mold cavity may be formed on the first portion of the mold, and the second surface of the mold cavity may be formed on the second portion of the mold. The first portion of the mold may be rotatably coupled to the second portion of the mold by a pivot joint. Accordingly, forming the mold cavity includes rotating the first portion toward the second portion, or vice versa, about the pivot joint. As previously discussed, the distance between the first and second surfaces of the mold cavity, while the mold is in the closed state, is less than or equal to 1 mm.

Next, as represented by block 92, a first portion of the liquid PVC flows through the first opening into the mold cavity, and a second portion of the liquid PVC flows through the second opening into the mold cavity. The first opening may be positioned remote from the second opening. Due to the high melt mass flow rate of the liquid PVC and the heated mold surface(s), as discussed above, the liquid PVC may flow throughout the entire mold cavity, which has a thickness of less than or equal to 1 mm, before solidifying/setting. As a result, the possibility of forming a knit line (e.g., an inconsistency within the resultant PVC cover layer at the intersection between separate liquid PVC flows) is substantially reduced or eliminated. While the liquid PVC flows through two openings in the illustrated embodiment, in other embodiments, the liquid PVC may flow through more or fewer openings (e.g., 1, 2, 3, 4, 5, 6, 7, 8, or more). In certain embodiments, the steps of the method 82 are performed in the order disclosed above. However, in other embodiments, the steps of the method may be performed in another suitable order. In addition, in certain embodiments, at least one of the steps of the method may be omitted.

Figure 8:
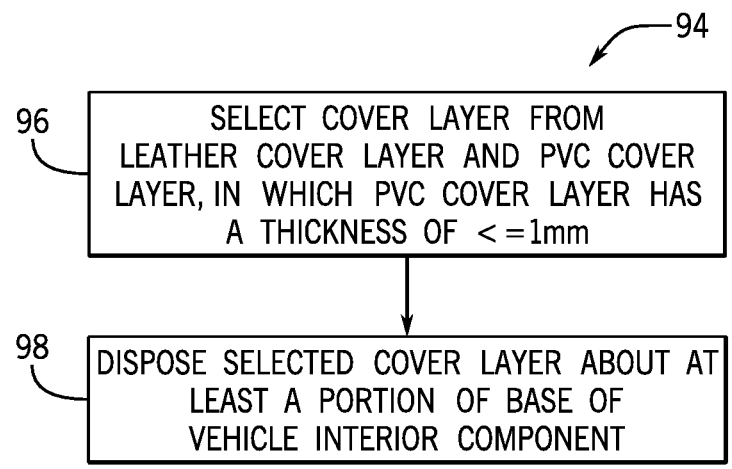
FIG. 8 is a flow chart of an embodiment of a method of manufacturing a vehicle interior component.

FIG. 8 is a flow chart of an embodiment of a method 94 of manufacturing a vehicle interior component. First, as represented by block 96, a cover layer is selected from a leather cover layer and a PVC cover layer, in which the PVC cover layer has a thickness of less than or equal to 1 mm. The cover layer may be selected based on options and/or a trim level of the vehicle including the vehicle interior component. The selected cover layer is then disposed about at least a portion of the base of the vehicle interior component, as represented by block 98. As previously discussed, the base includes the foam layer and the substrate layer (e.g., substantially rigid substrate). Because the PVC cover layer has a thickness of less than or equal to 1 mm, the thickness of the PVC cover layer may be substantially equal to the thickness of the leather cover layer (e.g., less than or equal to 1 mm thick). Accordingly, the PVC cover layer and the leather cover layer may be directly interchangeable with one another. As a result, a common base, including the foam layer and the substrate layer, may be utilized to form a vehicle interior component from either cover layer, thereby substantially reducing the cost and complexity associated with designing and manufacturing vehicle interior components (e.g., as compared to designing and manufacturing a first base for the leather cover layer and a second base for the PVC cover layer).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method of manufacturing a cover layer for a vehicle interior component, comprising:
   forming a mold cavity via a first surface and a second surface spaced apart from one another by a distance, wherein the first surface is configured to form a show surface of the cover layer, the second surface is configured to form a rear surface of the cover layer, and the distance is less than or equal to 1 mm;

heating the first surface, the second surface, or a combination thereof; and flowing liquid polyvinyl chloride into the mold cavity to form the cover layer having a thickness of less than or equal to 1 mm;

wherein a melt mass flow rate of the liquid polyvinyl chloride is greater than 80 grams per 10 minutes, and the liquid polyvinyl chloride is particularly formulated such that the cover layer has a shininess of less than 3 gloss units.

2. The method of claim 1, wherein the first surface has a grain pattern configured to establish a corresponding grain pattern within the show surface of the cover layer that simulates leather grain.

3. The method of claim 2, wherein the grain pattern of the first surface has at least one variation configured to form a corresponding variation within the show surface of the cover layer that simulates a blemish in the leather grain.

4. The method of claim 1, wherein heating the first surface, the second surface, or the combination thereof, comprises inductively heating the first surface, the second surface, or the combination thereof.

5. The method of claim 4, wherein inductively heating the first surface, the second surface, or the combination thereof, comprises:

separating the first surface from the second surface;

disposing an inductive heater between the first surface and the second surface; and inductively heating the first surface, the second surface, or the combination thereof, using the inductive heater;

wherein inductively heating the first surface, the second surface, or the combination thereof, is performed before forming the mold cavity.

6. The method of claim 1, wherein flowing liquid polyvinyl chloride into the mold cavity comprises flowing a first portion of the liquid polyvinyl chloride through a first opening into the mold cavity, and flowing a second portion of the liquid polyvinyl chloride through a second opening in the mold cavity, such that no knit line is formed within the cover layer at an intersection of the first and second portions of the liquid polyvinyl chloride; and wherein the first opening is positioned remote from the second opening.

7. The method of claim 6, wherein heating the first surface, the second surface, or the combination thereof, comprises inductively heating the first surface, the second surface, or the combination thereof.

8. The method of claim 1, wherein the liquid polyvinyl chloride is particularly formulated such that a first force sufficient to cause a first sample of the cover layer to move relative to a second sample of the cover layer is about 4 N while the first and second samples are in contact with one another, the first and second samples are static, and a 1 kg weight is placed on the first and second samples;

wherein the liquid polyvinyl chloride is particularly formulated such that a second force sufficient to cause the first sample of the cover layer to move relative to the second sample of the cover layer is about 3 N while the first and second samples are in contact with one another, the first sample is moving relative to the second sample, and the 1 kg weight is placed on the first and second samples; and wherein the first sample has dimensions of 50 mm by 76 mm, and the second sample has dimensions of 50 mm by 76 mm.

* * * * *